United States Patent [19]

Onishi

[11] 4,333,791

[45] Jun. 8, 1982

[54] ULTRASONIC SEAM WELDING APPARATUS

[75] Inventor: Heizo Onishi, Nagoya, Japan

[73] Assignee: Brother Kogyo Kabushiki Kaisha, Aichi, Japan

[21] Appl. No.: 196,641

[22] Filed: Oct. 14, 1980

[30] Foreign Application Priority Data

Oct. 27, 1979 [JP] Japan .......................... 54-149044[U]
May 20, 1980 [JP] Japan .......................... 55-69056[U]

[51] Int. Cl.³ ...................... B23K 19/04; B29C 27/08
[52] U.S. Cl. ............................ 156/580.1; 156/73.1; 156/580.2; 228/1 R
[58] Field of Search .................. 156/73.1, 73.4, 580.1, 156/580.2; 228/1 R

[56] References Cited

U.S. PATENT DOCUMENTS

| | | | |
|---|---|---|---|
| 3,242,029 | 3/1966 | Deans | 156/580.2 |
| 3,734,805 | 5/1973 | Obeda et al. | 156/580.1 |
| 3,955,740 | 5/1976 | Shoh | 228/1 |
| 4,131,505 | 12/1978 | Davis, Jr. | 156/580.2 |

FOREIGN PATENT DOCUMENTS

1167549 10/1969 United Kingdom .
1222159 2/1971 United Kingdom .
1524924 9/1978 United Kingdom .

Primary Examiner—Michael G. Wityshyn
Attorney, Agent, or Firm—Browdy and Neimark

[57] ABSTRACT

An ultrasonic seam welding apparatus for seam welding at least two sheet-like workpieces piled one above the other by imparting ultrasonic oscillation, including a machine frame, a converter-horn assembly which includes a horn having a circular flat surface perpendicular to, and concentric with, the longitudinal axis of the assembly for being oscillated in a parallel direction to the longitudinal axis of the assembly, a roller rotatably supported on the machine frame and having a peripheral surface being opposed to a radially biased position of the flat surface of the horn away from the axis thereof so as to hold the workpieces under pressure with the aid of spring means for urging the roller downwards between the peripheral surface of the roller and the flat surface of the horn. The seam welding is carried out by imparting the ultrasonic oscillation to the workpieces from the converter horn assembly with the aid of the roller while regularly feeding the workpieces in good manner. Adding of an elastic ring shaped member having a slightly larger diameter than the roller attached at least on one side of the roller further improves the pressing force and guiding function of the roller.

8 Claims, 3 Drawing Figures

ULTRASONIC SEAM WELDING APPARATUS

BACKGROUND OF THE INVENTION

This invention relates to an ultrasonic seam welding apparatus for seam welding workpieces of sheet state, which are piled in plurality one above the other for being held in forced contact between a horn coupled to an ultrasonic resonator and a presser roller, by means of feeding the workpieces while imparting the same ultrasonic oscillation.

As an apparatus in this category U.S. Pat. No. 3,734,805 discloses one in which workpieces are held in forced contact between a working surface formed on top of a horn oscillating in a longitudinal direction thereof and the external peripheral surface of a driven feed roller for being seam welded while being fed by the rotation of the roller. In this apparatus heat naturally generated by the compressive force repeatedly applied on the workpieces by the horn advantageously enhances the energy efficiency. Another advantage of this type apparatus is that no load in a lateral direction is applied to a horn assembly including the horn therein. An inherent weak point of this apparatus lies however in that some pieces of the piled workpieces forced to the horn are relatively inferior in the feeding to those on the opposite side, which is liable to produce wrinkles in the welded portion. U.S. Pat. No. 3,955,740 discloses on the other hand an apparatus, wherein a horn having a large diametered portion in it is parallely disposed to the rotational axis of an anvil wheel roller for being rotated so that workpieces are held in forced contact between the external peripheral surface of the large diametered portion of the horn and the external peripheral surface of the anvil wheel to be seam welded. This type apparatus is disadvantageous in that the energy efficiency is inferior to a case where the horn is perpendicularly contacted to workpieces because of the oscillating direction of the horn, i.e., the external peripheral surface of the large diametered portion of the horn, in this case being parallel to the workpieces under the process, while good feeding effect is being advantageously ensured by the light and smooth following rotation of the anvil wheel to the workpieces which are fed by the horn. A further disclosure can be seen in the U.S. Pat. No. 3,955,740, in which the axial oscillation of the horn is converted at the large diametered portion thereof to the radial direction before being transmitted to the workpieces. Even in this instance the energy efficiency is inevitably deteriorated in the course of the direction converting of the oscillation. In addition to the above, the horn is obliged to be under a power in the perpendicular direction to the axis of the horn for holding the workpieces inbetween with the anvil wheel, which necessitates (1) the build-up of the horn assembly supporting means to be solid and stout and (2) to disadvantageously narrow the bosom or depth of the processing area, that is the distance of the actual processing place away from the column of the machine frame, because the horn is hard to be projected from the machine frame very long due to its cantilever structure.

SUMMARY OF THE INVENTION

This invention was made from such a technological background. The primary object of this invention is to provide an ultrasonic seam welding apparatus which is high in energy efficiency because of the perpendicular contact of a horn to workpieces, while the horn is provided with an ability of feeding the workpieces so that they may be surely fed and processed.

In an apparatus of this invention aiming at attaining the above-mentioned object, a converter-horn assembly with a horn is rotated about an axis parallel to the oscillational direction of the horn. The horn is provided with a circular flat surface substantially perpendicular to, and concentric with, the rotation axis. A rotational presser roller is disposed in such a manner as to be urged toward the flat surface of the horn by urging means. The peripheral surface of the presser roller is placed opposite a portion of the flat surface which is off-set away from the rotation axis. Sheet-like thermoplastic workpieces are held in forced contact between the flat surface of the horn and the rotatable presser roller, and are fed owing to the rotation of the horn for being welded to each other.

Another object of this invention is to provide an ultrasonic seam welding apparatus wherein feeding of the workpieces is further improved. For attaining this object the presser roller is rotated in addition to the rotational driving of the horn.

A further object of this invention is to provide an ultrasonic beam welding apparatus wherein feeding of the workpieces must be not only smooth but also straight linear. In order to attain this object an elastic ring-shaped member having a slightly larger external diameter than that of the presser roller is disposed on at least one side of the pressing surface of the presser roller. The workpieces placed between the horn and the presser roller in forced contact is urged on one side thereof by the elastic ring-shaped member, which regulates the moving direction of the workpieces at a right angle to the axis of the presser roller, i.e., functions as a guide to the workpieces. An O-ring is practicable as this type elastic ring-shaped member.

Still another object of this invention is to provide an ultrasonic seam welding apparatus in which the workpieces are fed in good manner and in addition start and stop of the feeding can be regulated by a simple device. For attaining this object spring means, for urging the presser roller toward the horn, and manual operable means for holding the presser roller back to a position away from the horn are disposed.

DETAILED DESCRIPTION OF THE PREFERRED EMBODIMENTS

Figure 1:
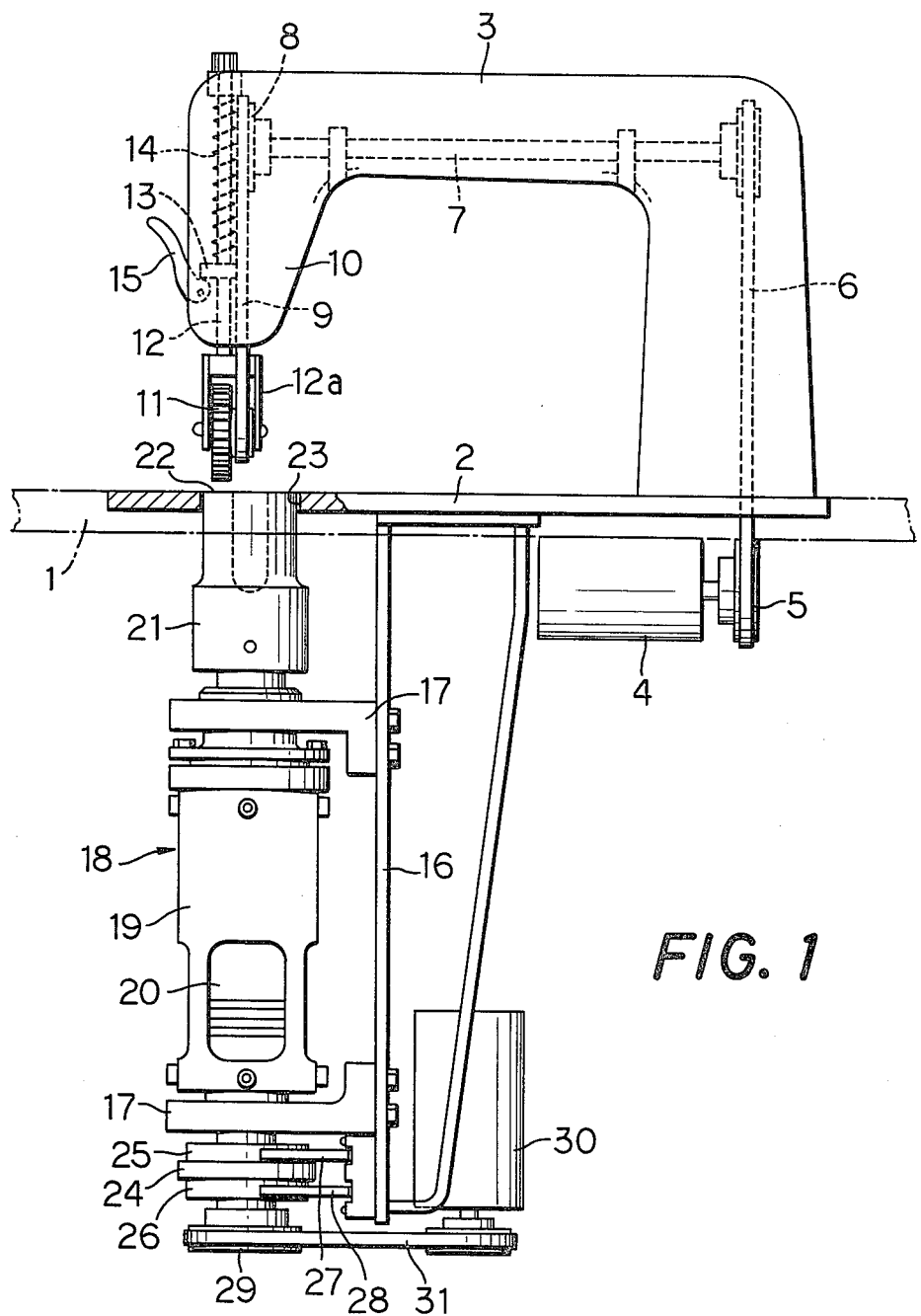
FIG. 1 is an elevational view of an embodiment of an ultrasonic welding apparatus of this invention.
Figure 2:
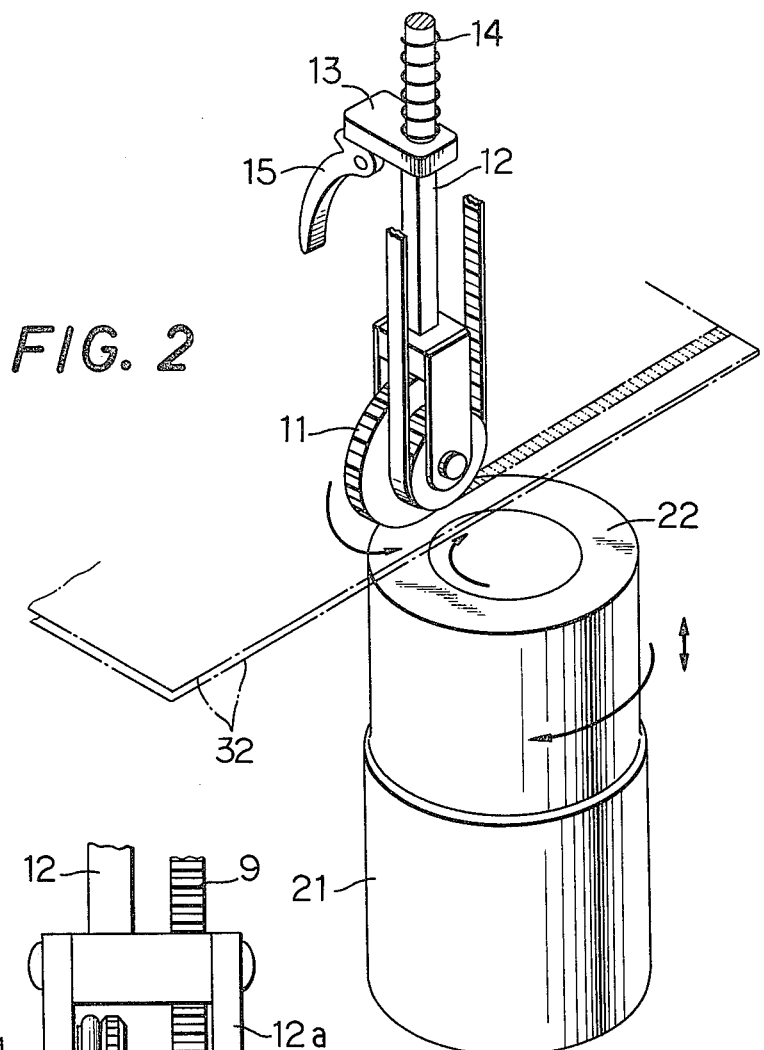
FIG. 2 is a perspective view of an essential part of the embodiment in FIG. 1.

With reference to FIGS. 1 and 2 an embodiment of this invention will be described hereunder.

A work table 1 constituting a part of a machine frame 16 is provided with a bed 2 secured thereon. An arm 3 is integrally formed with the bed 2 in a posture hanging thereover. An electric motor 4 is secured to the bed 2 from the lower side thereof. A pulley 5 is connected to the electric motor 4 by way of a belt 6 for being able to rotate a main shaft 7 retained in the arm 3. On the leftward end in FIG. 1 of the main shaft 7 another pulley 8 is secured, which is operatively connected via another belt 9 to a presser roller 11 disposed beneath a head portion 10 of the arm 3.

Within the head portion 10 of the arm 3 a presser bar 12 is slidably retained in an up-and-down or vertical direction. On the lower end of the presser bar 12 a roller holder 12a for rotatably supporting the presser roller 11 is secured. In the middle of the presser bar 12 a stopper 13 is fixedly attached. Between the stopper 13 and the upper wall of the arm 3 a compression spring 14 is installed for constantly urging the presser bar 12 downwardly. On the lower surface of the stopper 13 a cam portion of a lift lever 15 is abutted; while the lift lever 15 is held at a lifted position as illustrated in FIG. 1 the presser bar 12 is locked upward in a released position wherein the belt 9 stretched between the pulley 8 and the presser roller 11 is slackened. When the lift lever 15 is depressed downwards as shown in FIG. 2 the presser bar 12 is urged downwards by the action of the compression spring 14, causing this presser roller 11 to be abutted under pressure onto a later described horn 21.

On the lower side of the bed 2 the downwardly suspended machine frame 16 is secured; a pair of supports 17 of L-shape are secured on one side of the machine frame 16. Between the pair of the supports 17 a housing or casing 19 for accommodating a converter-horn assembly 18 is rotatably retained via not-shown bearings about the axis in an up-and-down or vertical direction thereof. Within the housing 19 an electroacoustic converter 20 is secured as an integral body. Upon supplying of high frequency current the electroacoustic converter 20 is given ultrasonic oscillation in the vertical direction.

The upper portion of the electroacoustic converter 20 is solidly or integrally connected to the cylindrically formed horn 21, whose upper end surface is made into a flat workpiece engaging surface 22 of annular shape, being perpendicular to the oscillating direction of the horn 21. This flat surface 22 is so designated as to be aligned at the same level with the top surface of the bed 2 through a circular aperture formed in the work table 1 and the bed 2, and at the same time as to be opposed to the presser roller 11 at a biased portion away from the rotational axis of the flat surface 22 in the radial direction. And at the abutting portion of the presser roller 11 and the flat surface 22, the rotational direction of both is made into identical or coincident so that workpieces 32 may be fed linearly in the backward direction as described later.

On the lower side of the converter-horn assembly 18 a pair of collecting rings 25, 26 are, with an insulating material 24 sandwiched inbetween, secured so that they may be integrally rotatable with the housing 19. To the collecting rings 25, 26 a pair of elastic contactors 27, 28 respectively secured at one end thereof to the machine frame 16 are connected, one of the contactors 27, 28 being connected to the plus terminal or pole and the other to the minus pole of a not-shown high frequency current generating system. Each of the collecting rings 25, 26 is respectively connected to each corresponding pole of the electroacoustic converter 20.

At the bottom of the converter-horn assembly 18 a pulley 29 is integrally secured. On the lower portion of the machine frame 16 another electric motor 30 is secured. The pulley 29 is connected to the motor 30 by way of a belt 31.

When the sheet-like workpieces 32 of thermoplastic resin material piled one above the other are seam welded, the presser roller 11 is held at the upper position by lifting up the lift lever 15 to the illustrated position in FIG. 1, the workpieces 32 consisting of at least two sheets piled are placed between the presser roller 11 and the horn 21, the lift lever 15 is depressed, after a process starting position has been determined for firmly sandwiching the workpieces 32 between the presser roller 11 and the horn 21. By switching ON of a starting switch (not shown) high frequency current is supplied from the not-shown high frequency current generating system via the contactors 27, 28 and the collecting rings 25, 26 to the electroacoustic converter 20 for imparting the horn 21 ultrasonic oscillation in the vertical direction. The workpieces 32 are seam welded by the oscillation. At this time the electric motor 4 and the electric motor 30 are simultaneously energized, so that the presser roller 11 is counterclockwise rotated as illustrated in FIG. 2 with an arrow by the motor 4 and the horn 21 is clockwise rotated by the motor 30. Therefore the workpieces 32 are as shown in FIG. 2 continuously seam welded while being fed backwardly.

In this embodiment the presser roller 11 and the horn 21 are respectively driven by a proper motor (4, 30). However, it is also possible to change the presser roller 11 into an idler roller to be rotated as a follower, through the feeding movement of the workpieces 32, of the horn 21 which is rotatably driven by its proper motor 30. Another alteration of making the horn 21 a solid cylindrical body instead of a hollow cylindrical body is of course permissible.

Figure 3:
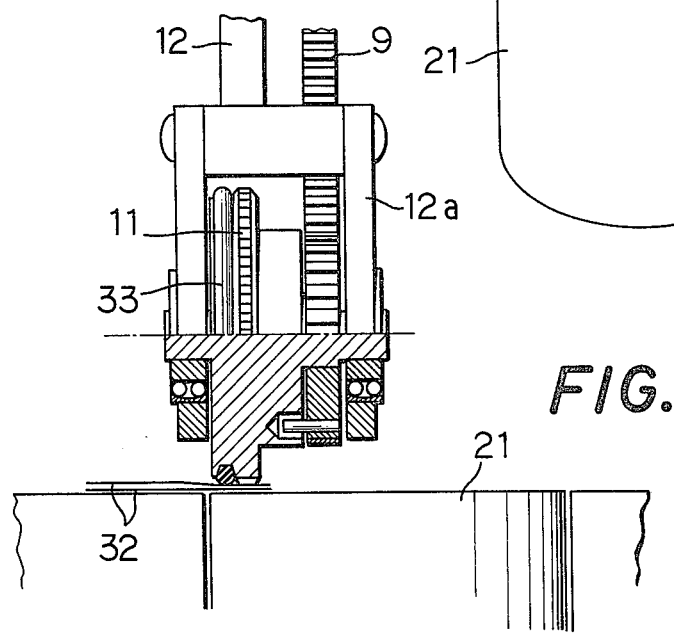
FIG. 3 is an elevational, partly sectional, view of an essential part of another embodiment of an ultrasonic seam welding apparatus of this invention.

Another embodiment of this invention is illustrated in FIG. 3, wherein the presser roller 11 is provided with a V-groove formed on the external peripheral surface thereof, being biased to the left side. Upon forming this V-groove the external diameter of the presser roller 11 on the left side thereof becomes slightly smaller than that of the remaining portion that is an actual pressing surface. In this annular V-groove an elastic ring-shaped member 33 is put, which is practically an O-ring with a circular sectional shape made of a high anti-heat and anti-friction rubber material, particularly preferably fluorine-contained rubber or the like. The external diameter of this elastic ring-shaped member 33, i.e., the O-ring is, made larger than that of the presser roller 11 by hundreds of $\mu$. This second embodiment is entirely identical to the first embodiment except this portion including the V-groove and the O-ring.

When the lift lever 15 is depressed in this second embodiment the elastic ring-shaped member 33 is urged onto the workpieces 32 to be deformed due to its own elasticity until the presser roller 11 is contacted to the workpieces 32. Consequently the workpieces 32 are sandwiched under pressure not only between the presser roller 11 and the horn 21 but also between the elastic member 33 and the horn 21. As a result, even when the oscillation of the horn 21 makes the apparent coefficient of friction between the presser roller 11 and the horn 21 remarkably low, the coefficient of friction between the elastic member 33 and the workpieces 32 can be relieved of a conspicuous lowering. The workpieces 32 can be fed due to this evident maintenance of the friction coefficient due to the elastic member 33 regularly in the tangent direction of the external peripheral surface of the presser roller 11, that is, in the perpendicular direction to the axis of the presser roller 11 under good regulation. This elastic member 33 contributes greatly to the guiding of the workpieces 32, which relieves the installation of a guide device for the workpieces 32 as well as the operator of this apparatus from skillfulness for the guiding.

As to the sectional shape of the elastic member 33, elliptical, polygonal, etc. are permissible, not being limited to the circular in this embodiment.

This invention should not be interpreted to be limited only to the described embodiments. Many variations and modifications can be made, for those skilled in the art, within the scope and spirit of the appended claims.

What is claimed is:

1. An ultrasonic seam welding apparatus comprising:
   a machine frame provided with a plurality of supports;
   a converter-horn assembly including a horn coupled to, for being oscillated in a parallel direction to a longitudinal axis of said assembly, an electroacoustic converter;
   said horn having a circular flat surface substantially perpendicular to, and concentric with, said longitudinal axis;
   bearing means interposed between said supports and said assembly for enabling said assembly to rotate about said longitudinal axis;
   a roller disposed rotatably on said machine frame;
   said roller having a peripheral surface, which is placed opposite to said flat surface and at a position off-set from said longitudinal axis in a radial direction;
   urging means for urging said roller toward said flat surface of said horn to hold two or more sheet-like thermoplastic workpieces between said roller and said flat surface; and
   a drive means for rotating said horn to feed said workpieces.

2. An ultrasonic seam welding apparatus according to claim 1, wherein said urging means consists of a spring.

3. An ultrasonic seam welding apparatus according to claim 1, wherein said horn is of cylindrical shape and said circular flat surface is provided with a circular opening at the center thereof.

4. An ultrasonic seam welding apparatus comprising:
   a machine frame provided with a plurality of supports;
   a converter-horn assembly including a horn coupled to, for being oscillated in a parallel direction to a longitudinal axis of said assembly, an electroacoustic converter;
   said horn having a circular flat surface substantially perpendicular to, and concentric with, said longitudinal axis;
   bearing means interposed between said supports and said assembly for enabling said assembly to rotate about said longitudinal axis;
   a roller supported rotatably on said machine frame;
   said roller having a peripheral surface, which is placed opposite to said flat surface and at a position off-set from said longitudinal axis in a radial direction;
   spring means for urging said roller toward said flat surface of said horn to hold plural sheet-like thermoplastic workpieces between said roller and said flat surface; and
   a drive means for rotating both said horn and said roller to feed said workpieces.

5. An ultrasonic seam welding apparatus comprising:
   a machine frame provided with a plurality of supports;
   a converter-horn assembly including a horn coupled to, for being oscillated in a parallel direction to a longitudinal axis of said assembly, an electroacoustic converter;
   said horn having a circular flat surface substantially perpendicular to, and concentric with, said longitudinal axis;
   bearing means interposed between said supports and said assembly for enabling said assembly to rotate about a longitudinal axis;
   a roller supported rotatably on said machine frame;
   said roller having a peripheral pressing surface, which is placed opposite to said flat surface and at a position off-set from said longitudinal axis in a radial direction;
   spring means for urging said roller toward said flat surface of said horn to hold plural sheet-like thermoplastic workpieces between said peripheral pressing surface and said flat surface;
   drive means for rotating said horn to feed said workpieces; and
   an elastic ring-shaped member disposed on at least one lateral side of the peripheral pressing surface of said roller, and having slightly larger external diameter than said roller.

6. An ultrasonic seam welding apparatus according to claim 5, wherein said elastic ring-shaped member consists of O-ring made of rubber.

7. An ultrasonic seam welding apparatus according to claim 5, wherein said roller is rotated by driving means.

8. An ultrasonic seam welding apparatus comprising:
   a machine frame provided with a plurality of supports;
   a converter-horn assembly including a horn coupled to, for being oscillated in a parallel direction to a longitudinal axis of said assembly, an electroacoustic converter;
   said horn having a circular flat surface substantially perpendicular to, and concentric with, said longitudinal axis;
   bearing means interposed between said supports and said assembly for enabling said assembly to rotate about said longitudinal axis;
   a roller supported rotatably on said machine frame;
   said roller having a peripheral surface, which is placed opposite to said flat surface and at a position off-set from said longitudinal axis in a radial direction;
   spring means for urging said roller toward said flat surface of said horn to hold plural sheet-like thermoplastic workpieces between said roller and said flat surface;
   a drive means for rotating said horn to feed said workpieces; and
   manual operable means for holding said roller at a position away from said flat surface of said horn against the urging force of said spring means.

* * * * *